Figure 1:
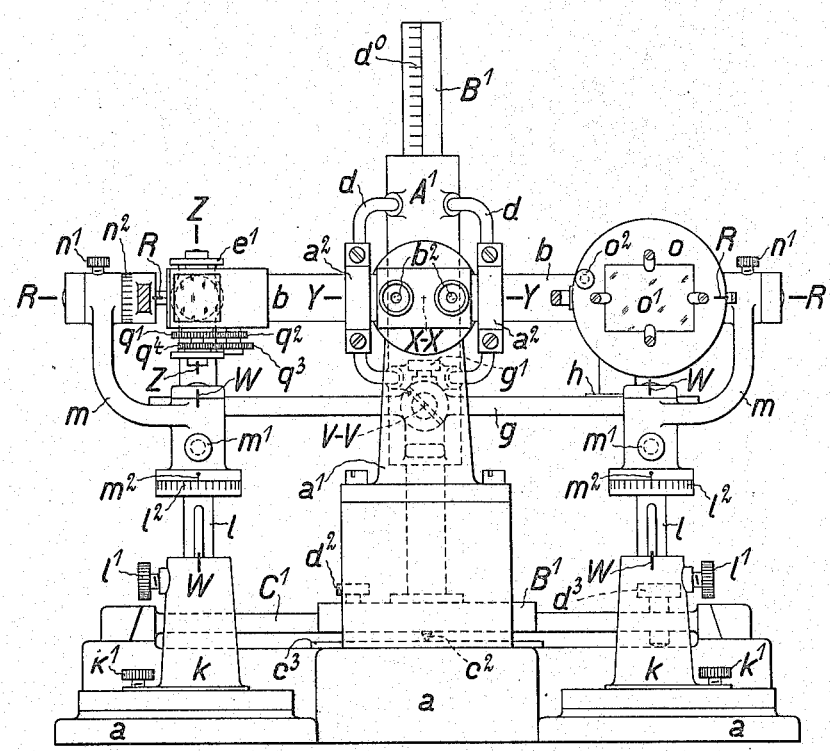

Aug. 12, 1924. 1,504,384
F. SCHNEIDER
COPYING DEVICE
Filed Aug. 13, 1921  2 Sheets-Sheet 2

Inventor:
Friedrich Schneider

Patented Aug. 12, 1924.

1,504,384

UNITED STATES PATENT OFFICE.

FRIEDRICH SCHNEIDER, OF JENA, GERMANY, ASSIGNOR TO THE FIRM OF CARL ZEISS, OF JENA, GERMANY.

COPYING DEVICE.

Application filed August 13, 1921. Serial No. 492,133.

*To all whom it may concern:*

Be it known that I, FRIEDRICH SCHNEIDER, a citizen of the German Republic, and residing at Jena, Germany, have invented a new and useful Copying Device (for which I have filed an application in Germany March 5, 1920, and England March 2, 1921), of which the following is a specification.

The present invention relates to a device for copying the surface, to be obtained from a photostereogram, of a spatial form, which device is fitted with a copying system, which contains a member movable in any desired direction, and guided so as to be parallel to itself, and the copying tool of which system participates at least in the movements of the said member in a plane. The object of the present invention is to provide a device permitting of a continuous copying of the surface of a spatial form, event when the relative position of the two photograms of which the said form is to be obtained was quite optional during the exposure.

A device equipped according to the present invention shows the following characteristic features: An image-measuring system contains a binocular double telescope, the base-line of which has with the aid of a reflector system been brought to a multiple of the interocular distance and which is so disposed as to be rotatable about an axis parallel to its base-line, and which further contains two sighting marks arranged in such a manner that the two sighting lines and the base-line determine a plane hereinafter called (the measuring plane). Moreover, the entrance reflectors of the reflector system are constructed and rotatably disposed in such a manner that any rotation of either reflector involves a variation of inclination of the sighting line belonging to it in the measuring plane. The double telescope is connected with the said member, which may be adjusted in space at will, of the copying system by means of two links, which are so mounted to the said member that they may swing in all directions, while they are mounted to the double telescope in such a manner that each of them may be rotated about an axis which is perpendicular to the measuring plane, the plane determined by the two axes of rotation being parallel to the base-line of the double telescope. Besides, each of the two links is coupled with one of the two entrance reflectors in such a manner that the said reflector, when the link belonging to it is rotated in the measuring plane, is caused to rotate an angle equal to half the angle of rotation of the link, in which manner, therefore, the appertaining sighting line is always turned through the same angle as the link. The links have to be disposed in such a manner that each of them is parallel to the sighting line belonging to it. By the projection of the links and the connecting line of the points of intersection of the axes of rotation of the links, there will then in the measuring plane in each case be determined a triangle, which is similar to the measuring triangle determined by the sighting line and the base-line of the double telescope. Furthermore, two objectives are disposed each in front of one of the two entrance reflectors so as to be universally adjustable independently of the movements of the double telescope and serving each for the observation of the appertaining photogram. Moreover, each photogram is coupled with the objective belonging to it in such a manner that a setting of the objective causes a similar setting of the photogram. Furthermore, the two entrance reflectors of the double telescope are constructed in such a way as to act partly reflecting partly transmitting the light. Moreover, two collimators are disposed, each of which being so firmly connected with one of the two links that its axis (or, if the same is refracted, its reflexion) is parallel to that of the said link, and with each of these two collimators a reflecting surface being firmly connected which serves for presenting to the reflecting part of this entrance reflector the image of the appertaining image plate, projected by the appertaining objective. The said reflecting surface may, e. g., be so connected with the collimator as to lie between the latter and the appertaining entrance reflector. In that case it must be represented by a reflecting surface of such construction as to allow of observing simultaneously the sighting mark of the collimator and the appertaining image plate. In order to attain the highest possible luminosity, each of the two reflecting surfaces is disposed to advantage in the appertaining collimator in such a manner as to contain its sighting mark. The reflecting surfaces may then either reflect diffusely, which can, e. g., be attained by the use of ground glasses, or, with a view to obtain sharper images of higher luminosity, they may be represented by reflecting surfaces. In the most simple case these reflecting surfaces are assumed to be plane.

If the measuring triangle be set in such a manner that the pair of sighting marks is seen as coinciding in successive order with the images corresponding to one another of the surface points of the form to be copied, the copying tool produces on the copy-carrier the desired copy. When the focal length of the two objectives is the same as that of the corresponding objectives used in taking the two photograms, then, on copying spatially, the copied model is similar to the original form, or, on copying on a plane surface, the copied plan similar to the corresponding plan of the original form. The serviceableness of the device remains the same when the copy-carrier takes the place of the copying tool, and, therefore, participates in the movements of the said member of the copying system. In this instance the copying tool should have to be made stationary.

Figure 2:
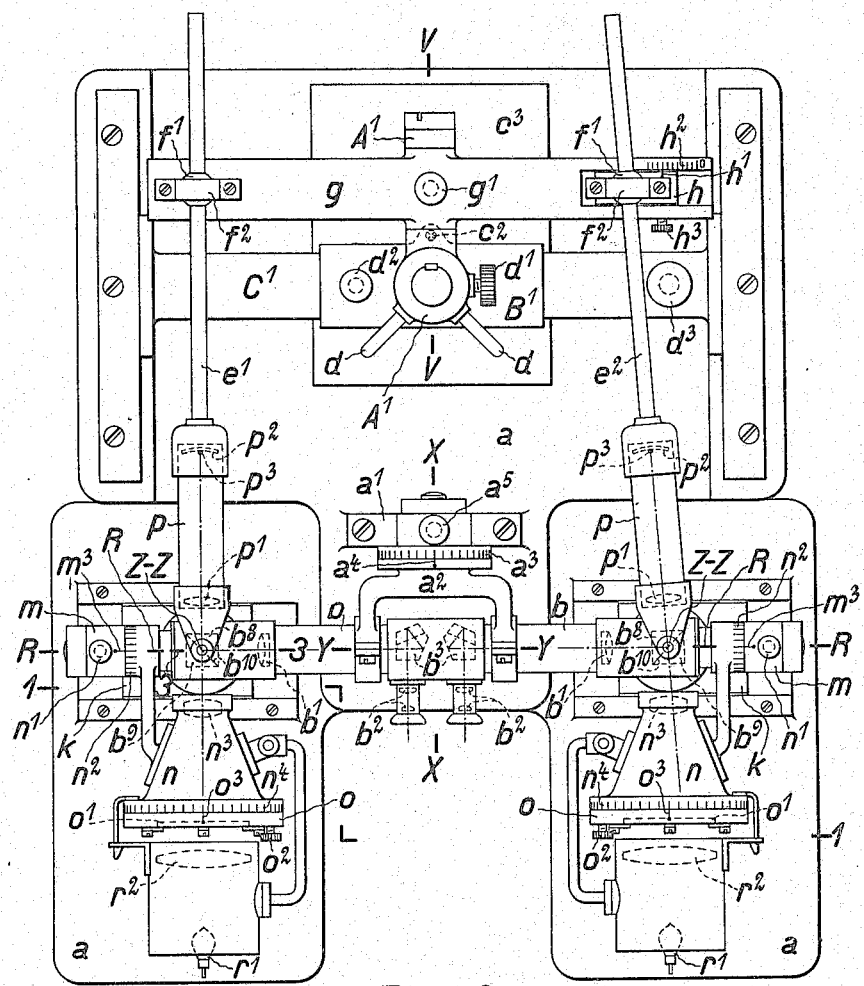
Figure 3:
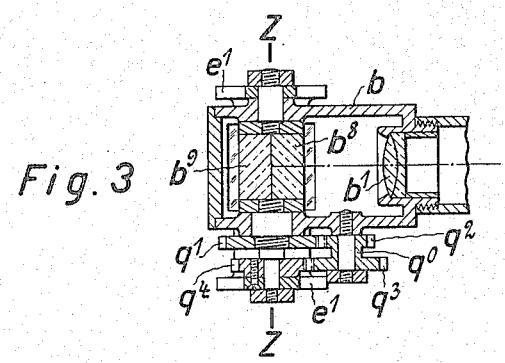

The drawing shows a constructional example according to the invention, in which example a device for drawing any lines, especially those of the same level, of the spatial form to be obtained from a photostereogram, on a plane surface is represented. Fig. 1 is a front elevation, Fig. 2 a plan elevation and Fig. 3 a part-section.

In a standard $a^1$, which is secured to a bed-plate $a$, there is supported a pedestal body $a^2$ so as to be rotatable about an axis X—X, which is parallel to the bed-plate. An index $a^4$ of the pedestal body $a^2$ indicates on a graduation $a^3$ of the standard $a^1$ the inclination set in each case of the base-line relatively to the horizontal plane. A clamping screw $a^5$ serves for fixing the pedestal body $a^2$ relatively to the standard $a^1$. In the pedestal body $a^2$ a binocular double telescope $b$ is rotatably supported in such a manner that its axis of rotation Y—Y is parallel to its base-line, and intersects the axis of rotation X—X perpendicularly. Each of the two halves of the double telescope contains optical members consisting of an objective $b^1$, an ocular $b^2$, a pentagonal prism $b^3$, fitted with a ridge, and a double prism composed of two prisms $b^8$ and $b^9$. The hypotenusal surfaces of the prisms $b^8$ and $b^9$ are cemented one upon another and, besides, of the cemented surface $b^{10}$ a number of square parts of equal size are silvered and separated from each other by an even number of uncoated parts of the same size. Moreover, the double prisms $b^8$, $b^9$ are rotatably disposed each about an axis Z—Z, perpendicular to their chief reflecting plane, which axis intersects vertically the axis of rotation Y—Y of the double telescope and coincides with the axis of rotation of the appertaining link. The bed plate $a$ furthermore carries a spatial cross slide system, which consists of a height-slide $A^1$, a breadth slide $B^1$, and a depth slide $C^1$, which are disposed in such a manner that the direction of displacement of the depth slide (the depth direction) coincides with the axis of rotation X—X of the pedestal body $a^2$. The breadth slide $B^1$, is provided with a drawing pencil $c^2$; the appertaining drawing board $c^3$ is fixed to the bed plate $a$. The height-slide $A^1$ carries two manipulating handles $d$, by means of which the three slides $A^1$, $B^1$, and $C^1$ may be displaced at will by the observer at the double telescope $b$ during observation. The height-slide $A^1$ may be clamped on the breadth-slide $B^1$ by means of a clamping screw $d^1$, the breadth-slide on the depth-slide $C^1$ by means of a clamping screw $d^2$, and the depth-slide on the bed plate $a$ by means of a clamping-screw $d^3$. Besides, on a scale $d^0$ of that part of the breadth-slide on which the height-slide is guided, the upper edge of the height-slide indicates the height of the style $c^2$ above the horizontal plane determined by the base-line of the double telescope $b$. Two links $e^1$ and $e^2$ serve for coupling the cross-slide system with the double telescope. They are displaceably supported in two bearing-balls $f^1$, which are universally rotatable in stationary bearings $f^2$. The bearing $f^2$ belonging to the link $e^1$ is fixed to a plate $g$, which is supported on the height-slide $A^1$, so as to be rotatable about an axis V—V lying in the depth-direction, and which may be clamped on the height-slide by means of a clamping-screw $g^1$. The bearing $f^2$ belonging to the link $e^2$ is carried by an intermediate slide $h$, which may be set relatively to the plate $g$ in the direction of the base-line of the double telescope. Moreover, the arrangement has been made in such a manner that the connecting line of the centres of the two bearing-balls $f^1$ is parallel to the direction of displacement of the intermediate slide $h$. The intermediate slide $h$ is provided with an index $h^1$, which indicates on a scale $h^2$ of the plate $g$ the displacements of the intermediate slide out of its zero-position. When the two links are parallel to one another, the value zero is indicated. The slide $h$ may be clamped on the height-slide $A^1$ by means of a clamping-screw $h^3$. The ratio of the length indicated on the scale $h^2$ to the relative distance of the two axes of rotation Z—Z represents the scale of the copy. When the two links are horizontal, the upper edge of the height-slide indicates on the scale $d^0$ on the value zero. Each of the two links $e^1$ and $e^2$ is firmly connected with a collimator $p$, the optical axis of which coincides with the axis of the link and which contains an objective $p^1$ and a concave mirror $p^2$, touching the focal plane in the optical axis, the said concave mirror being provided with a sighting mark $p^3$, lying in the focal plane of the collimator. Each link is coupled with the double prism $b^8$, $b^9$ belonging to it in such a manner that any rotation of the link about its axis of rotation Z—Z results in a rotation of half that amount of the entrance prism about the same axis of rotation and, thereby, in a rotation equal to that of the link of the corresponding sighting line in the measuring plane. For this purpose each double prism is (vide Fig. 3) firmly connected with a toothed wheel $q^1$, which meshes with a gear $q^2$ of a wheel body $q^0$, rotatably disposed on the double telescope, the gear ratio being so chosen, that the wheel body $q^0$ always undergoes double the rotation of the toothed wheel $q^1$. A second gearing $q^3$ of the wheel body $q^0$ engages in a toothed wheel $q^4$, screwed to the appertaining link, the gear ratio based upon being 1:1. Mounted on the bed plate $a$ are two standards $k$, which are adjustable in the breadth-direction, and each of which may be clamped on the bed-plate by means of a clamping-screw $k^1$. In each of the said standards a column $l$ is disposed so as to be adjustable by means of slot and key in the height-direction, which column may be clamped on the standard by means of a clamping-screw $l^1$. On each column $l$ a holder $m$ is supported so as to be rotatable about an axis W—W, which lies in the height-direction, and intersects the axis of rotation Y—Y of the double telescope $b$. The holder $m$ may be secured to the column $l$ by means of a clamping-screw $m^1$, the index $m^2$ of the holder $m$ indicating on a graduation $l^2$ of the column in each case the position of the holder relatively to the column. In each of the holders $m$ a casing $n$ is supported so as to be rotatable about an axis R—R, which intersects the axis of rotation W—W of the bar perpendicularly, which casing may be fixed to the holder by means of a clamping-screw $n^1$, an index $m^3$ of the holder $m$ indicating on a graduation $n^2$ of the said casing the position the casing occupies in each case relatively to the holder. In each casing $n$ an objective $n^3$ is fixed in such a manner that its axis intersects the axis of rotation R—R of the casing $n$ perpendicularly. Furthermore, in each casing a frame $o$, in which one of the two negatives $o^1$ to be utilized is secured, is rotatably disposed in such a manner that its axis of rotation coincides with the objective-axis. A clamping-screw $o^2$ serves for clamping the frame $o$ on the casing $n$, an index $o^3$ of the frame indicating on a graduation $n^4$ of the casing $n$ the turning which is set in each case of the fixed negative $o^1$. The turning zero is indicated when the horizon of the plate is perpendicularly directed to the height-direction. When the index $m^3$ indicates on the graduation $n^2$ the value zero, the axis of the objective $n^3$ stands perpendicularly on the height-direction. When in this case the index $m^2$ indicates on the graduation $l^2$ the value zero, the axis of the objective $n^3$ falls into the depth-direction. Each of the casings $n$ carries, in addition, a device for illuminating the negatives, which may be folded in and contains a source of light $r^1$ and a condenser $r^2$. The image of the object and the marks presented to the observer are obtained in the following manner. Both on the left and right-hand side by means of the objectives $n^3$ and $p^1$ and making use of the uncoated parts of the cemented surface $b^{10}$, an image of the appertaining negative is produced in the focal plane of the collimator $p$, viz., owing to the prescribed movement of the link in such a manner, that the semi-image of the object-point focussed at in each particular case coincides with the sighting mark $p^3$. With the aid of the concave mirror $p^2$ and the objective $p^1$, and, making use of the silvered parts of the cemented surface $b^{10}$, both the image of the marks and of the object are then rendered open to observation through the double telescope. Owing to the aforesaid arrangement it is achieved that, because both the image of the marks and of the object already coincide on each side prior to their reaching the reflecting part of the cemented surface $b^{10}$, any errors which may arise by transmitting the motions of the links to those of the double prisms $b^8$, $b^9$, do not affect the measurement.

In lieu of the common actuating device, embodied by the handles $d$, of the three slides $A^1$, $B^1$, and $C^1$, a separate actuating device for each of these slides could also be provided. These actuating devices would then advantageously have to be arranged in such a manner that the observer could move two of them by hand.

In order to get the device ready for use, first of all the slide $h$ has to be clamped on the plate $g$ in that position in which the index $h^1$ indicates on the scale $h^2$ the value zero, while the height-slide $A^1$ has to be clamped on the breadth-slide $B^1$ in that position in which its upper edge indicates on the scale $d^0$ the value zero. When by this means the two links $e^1$ and $e^2$ have been brought into such a position as to be parallel to one another, and horizontal, by adjusting the breadth-slide $B^1$ they have to be set in such a manner that they lie in the depth-direction. This causes each of the two double prisms $b^8$, $b^9$ to occupy its middle position, in which the appertaining sighting line lies in the depth-direction. Thereupon, by turning the pedestal body $a^2$ about its axis X—X the double telescope $b$ has to be set in such a manner that the index $a^4$ indicates on the graduation $a^3$ the angle of inclination of the base-line employed, when the photograms were taken, relatively to the horizontal plane. Thereby, owing to the coupling between the double telescope $b$ and the plate $g$ by means of the links, the plate $g$ is caused to perform a like turning about the axis V—V. The adjustment having been effected, the clamping-screws $a^5$ and $g^1$ have to be tightened. Thereupon, the fork-shaped bars $m$ have to be secured each to the respective column $l$ in that position in which the indices $m^2$ indicate on the graduation $l^2$ the value zero, and, in addition, the casings $n$ have to be secured each to the respective holder $m$ in that position in which the indices $m^3$ indicate on the graduations $n^2$ the value zero. This brings the objectives $n^3$ into such a position that their axes fall into the depth-direction. Furthermore, by setting the standards $k$ in the breadth-direction, and the columns $l$ in the height-direction, the holders $m$ have to be brought into that position in which the axes of the objectives $n^3$ coincide with the sighting lines of the double telescope, whereupon the clamping-screws $k^1$ and $l^1$ have to be tightened. Then, after loosening the clamping-screws $m^1$, the holders $m$ have to be set in such a manner that their indices $m^2$ indicate on the graduations $l^2$ those angles which during the exposure the horizontal projections of the objective-axes have embraced with that perpendicular to the base-line which lies in the horizontal plane. Besides, after loosening the clamping-screws $n^1$, the casings $n$ have to be set in such a manner that on their graduations $n^2$ the indices $m^3$ indicate those angles by which during the exposure the objective-axes were inclined relatively to the horizontal plane. In this manner the axes of the objectives $n^3$ are brought into the same spatial position with respect to the base-line of the double telescope which the axes of the objectives used in taking the photograms had relatively to the base-line adhered to during the exposure. After the said adjustment the clamping-screws $m^1$ and $n^1$ have to be tightened again. Thereupon, the negatives $o^1$ have to be secured each in the respective frame $o$ in such a manner that their sensitized surfaces are turned towards the objectives $n^3$, and, in addition, the frame $o$ in the casings $n$ have to be secured by means of the clamping-screws $o^2$ in that position in which their indices $o^3$ indicate on the graduations $n^4$ the amount by which the cameras were turned about the objective-axes during the exposure. When, finally, the slide $h$ is set in such a manner that its index $h^1$ indicates on the scale $h^2$ the value, measured in the scale of the drawing to be made, of the base-line adhered to during the exposure, and is secured in this position by means of the clamping-screw $h^3$, the device is ready for use. For carrying out the copying the cross-slide system has to be moved by the observer at the double telescope $b$ with the aid of the handles $d$ in such a manner that the pair of sighting marks $b^7$ is seen as coinciding in successive order with the image-points corresponding to one another of the negatives $o^1$. For drawing height-lines it is necessary to clamp the height-slide $A^1$ on the breadth-slide $B^1$ by means of the clamping-screw $d^1$ in such a manner that its upper edge indicates the corresponding height-value on the scale $d^0$.

The drawing is based upon the simplest case possible during the exposure in which the base-line is horizontal, and the objective-axes are horizontal, and perpendicular to the base-line. Besides, on the graduations $a^3$, $l^2$, and $n^2$ the value zero is indicated. In Fig. 1 for simplicity's sake the casing $n$ containing the objective $n^3$ and the negative $o^1$ has been omitted in front of the left-hand single telescope.

I claim:

1. In a device for copying from a pair of photograms a copying system containing a member movable in any desired direction and a copying tool movable at least in a plane, coupling means between the movable member and the copying tool, a measuring system, a binocular telescope forming part of this system and comprising a reflector system rotatably disposed about an axis parallel to the base-line of the telescope and so arranged that the distance apart of the entrance axes of this telescope is a multiple of the interocular distance, the foremost reflectors of this reflector system being constructed in such a way as to act partly reflecting, partly transmitting the light and being rotatably disposed each about an axis perpendicular to their chief reflecting plane, two links for connecting this binocular telescope with the said member of the copying system, each of these two links being rotatably disposed on the said members about a point and being further disposed on the said telescope rotatably about an axis parallel to the axes of rotation of the said two foremost reflectors, means for coupling each of the said two links to one of the said two foremost reflectors, these means being adapted to impart to the reflector a rotation by half the amount of rotation of the respective link, two objectives, each of which being disposed universally adjustable in front of one of the said two foremost reflectors, means for coupling each of the said photograms with the respective objective in such a manner that a displacement of the latter results in a similar displacement of the photogram, and two collimators, each of which consists of a lens and a sighting mark and is firmly connected with one of the said two links in such a manner that its optical axis is parallel to that of the link and that its lens faces the respective foremost reflector.

2. In a device for copying from a pair of photograms a copying system containing a member movable in any desired direction and a copying tool movable at least in a plane, coupling means between the movable member and the copying tool, a measuring system, a binocular telescope forming part of this system and comprising a reflector system rotatably disposed about an axis parallel to the base-line of the telescope and so arranged that the distance apart of the entrance axes of this telescope is a multiple of the interocular distance, the foremost reflectors of this reflector system being constructed in such a way as to act partly reflecting, partly transmitting the light and being rotatably disposed each about an axis perpendicular to their chief reflecting plane, two links for connecting this binocular telescope with the said member of the copying system, each of these two links being rotatably disposed on the said member about a point and being further disposed on the said telescope rotatably about an axis parallel to the axes of rotation of the said two foremost reflectors, means for coupling each of the said two links to one of the said two foremost reflectors, these means being adapted to impart to the reflector a rotation by half the amount of rotation of the respective link, two objectives, each of which being disposed universally adjustable in front of one of the said two foremost reflectors, means for coupling each of the said photograms with the respective objective in such a manner that a displacement of the latter results in a similar displacement of the photogram, two collimators, each of which consists of a lens and a sighting mark and is firmly connected with one of the said two links in such a manner that its optical axis is parallel to that of the link and that its lens faces the respective foremost reflector, and two reflecting surfaces, each of which being disposed in one of the two collimators and containing the respective sighting mark.

FRIEDRICH SCHNEIDER.